March 10, 1964   A. H. BRENNESHOLTZ ETAL   3,124,320
SPOOL
Filed Feb. 10, 1961

INVENTORS
AARON H. BRENNESHOLTZ
LANSING V. REYNOLDS
BY *Weston B. Wardell Jr.*
ATTORNEY 3,124,320
SPOOL
Aaron H. Brennesholtz, Lancaster, Mass., and Lansing V. Reynolds, Westfield, N.J., assignors to E. I. du Pont de Nemours and Company, Wilmington, Del., a corporation of Delaware
Filed Feb. 10, 1961, Ser. No. 88,433
1 Claim. (Cl. 242—71.8)

This invention relates to a spool for flexible film material. More particularly it relates to a film spool for use in motion picture cameras. Still more particularly it relates to a one-piece spool molded from artificial material.

An object of this invention is to provide an improved one-piece molded camera spool. Another object is to provide such a spool which is sturdy, is light in weight and is of simple construction. A further object is to provide such a film spool which is economical to produce and yet is efficient and reliable in use.

Figure 3:
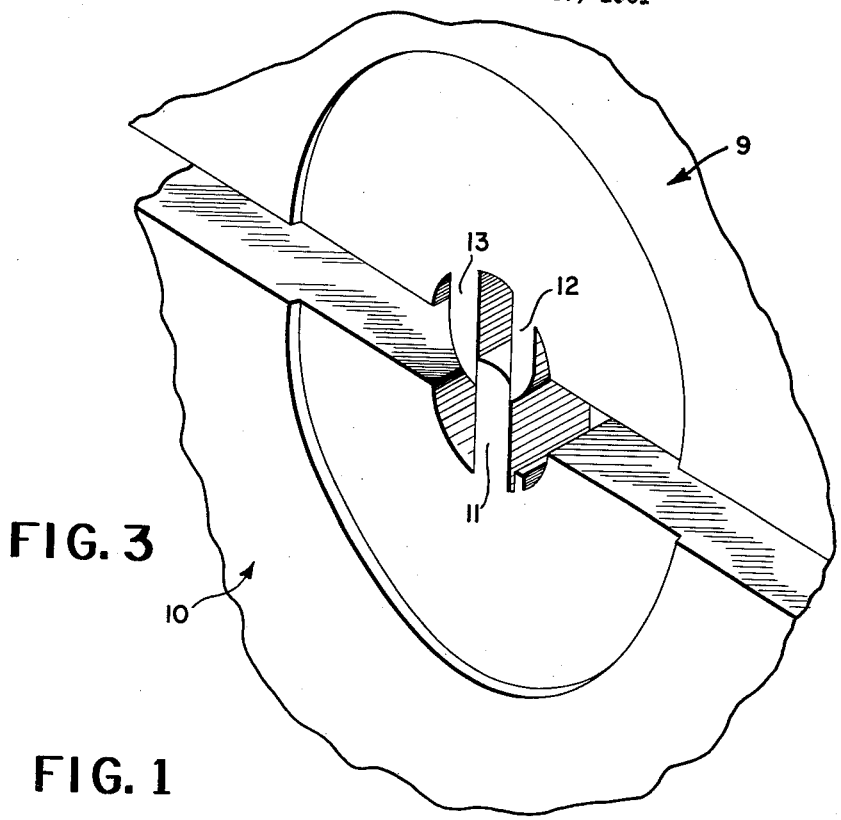
Figure 1:
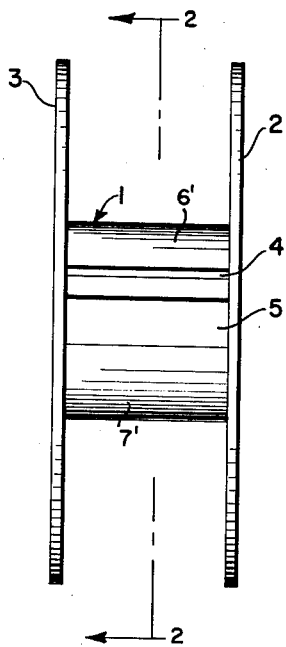
Figure 2:
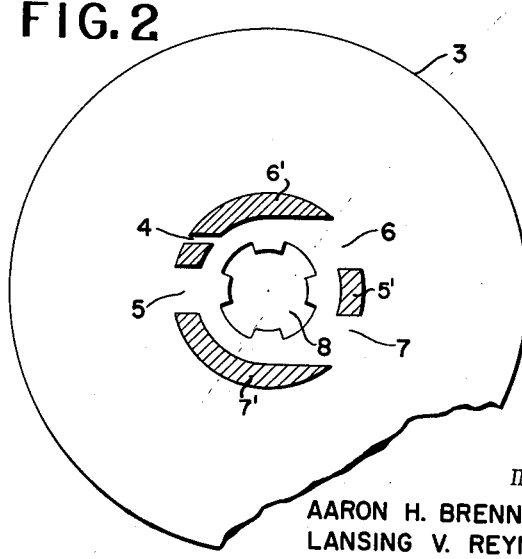

The spool will now be more fully described with reference to the accompanying drawing which forms a part of this application. In the drawing, the same reference numerals refer to the same parts throughout the several views. With reference to the drawing FIG. 1 is a front elevational view of the spool;
FIG. 2 is a transverse cross-sectional view taken substantially along line 2—2 of FIG. 1; and
FIG. 3 is a fragmentary view showing the mold sections in separated relationship.

The novel one-piece spool of this invention, as illustrated in the drawing, comprises of hollow, cylindrical hub 1 and integrally connected to opposite ends of the hub flange members 2 and 3. The flange members are of the configuration and type used in prior art motion picture spools. They have a central aperture for reception of a coacting member, e.g., the camera spindle, shaft, arbor or key projection. The aperture generally has splines extending radially inwardly toward the axial center of the flange. One flange member may have an aperture having three splines and the opposite flange member an aperture having four splines although other aperture configurations are possible, e.g., holes, slots, etc., for engaging various driving and orienting means for film reels. Suitable such apertures for engaging a coacting part of a camera, recording apparatus, projector, etc., are described in U.S. Patents 1,941,522, 2,180,829, 2,380,788 and 2,643,072. The hub 1 has three essentially parallel longitudinal slots 5, 6 and 7 which extend the entire length of the hub dividing it into hub sections 5', 6', and 7' and terminate at the inner side of the flange members. The slots also extend through the hub into the center hollow area 8. Slot 4 located in hub section 6' is narrow so that motion picture film can be inserted in the slot and be engaged thereby. The narrow slot is preferably only slightly wider than the film to be inserted. Slots 5, 6 and 7 are of substantially greater width than the narrow film-engaging slot 4 and cannot be used to engage the film. Preferably slots 5, 6 and 7 are essentially the same width with respect to one another and range from 4 to 30 times the width of narrow slot 4. The dimensions of the wide slots are not critical, but if the slots are too wide, the strength of the spool is weakened. Slot 5 is the only slot having both parallel walls and an axis which passes through the center of the hub. It is positioned adjacent narrow slot 4, separated by a thin strip of the hub. Slots 6 and 7 are positioned on the side of the hub opposite slots 4 and 5 and are separated by a strip of hub equal to the width of slot 5.

The roll of film may be placed on the spool by merely inserting the end of the film into the narrow, film-engaging slot 4. Because the slot is non-axial, the film is guided not only through the slot into the center hollow area of the hub but makes an angle of less than 90° with itself as it is wound around the hub. By this means the film is held fast as the remaining film is then wound on the spool.

The novel one-piece spool, described above, is made by molding, e.g., by injection molding as described in Delmonte's "Plastics Molding," John Wiley & Sons, Inc., New York, pp. 296–387 (1952). The mold for making the spool which is shown in separated relationship in FIG. 3 comprises upper and lower sections 9 and 10, respectively. Wide slots 5, 6 and 7 are formed by extension 11 of lower section 10 and extensions 12 and 13 of upper section 9, respectively. Slots 5, 6 and 7 are of greater width than film slot 4 so that the upper and lower mold sections can more easily slide in and out of each other in a straight line and still form the curved sections of the hub. The wide slots also decrease the weight of spool and eliminate plastic material. Inserts (not shown) are centrally placed on the axis of the mold to form the three- and four-splined or other type aperture for reception of the coacting member, e.g., spindle, shaft, arbor, key projection, etc.

When the mold is assembled in an injection molding machine, a suitable molding material is injected into the mold, the material is cooled and the upper and lower sections are opened first to allow removal of the spool. It is readily understood that the dimensions of any part of the spool can be varied merely by changing the dimensions of the mold sections. Directions for engaging the film on the spool, indexing and other identifying characters can be incorporated in the mold.

Suitable molding materials include synthetic resins, superpolymers and cellulose derivatives, e.g., cellulose acetate, cellulose propionate, cellulose acetate butyrate, cellulose acetate propionate, methyl cellulose, ethyl cellulose, benzyl cellulose; polystyrene, alkyd resins, cresol-formaldehyde resins, vinyl resins, e.g., polyvinyl chloride, polyvinyl fluoride, polyvinylidene chloride; polyolefins, e.g., polyethylene, polypropylene, and copolymers thereof; polymethyl methacrylates, polyfluorocarbons, e.g., polychlorotrifluoroethylene, polytetrafluoroethylene; polyoxymethylene, nylons, etc. A preferred composition, because of its excellent physical properties, is any of the nylon resins, e.g., polyhexamethyleneadipamide, polyhexamethylene sebacamide, polycaprolactam, and the many copolymers and terpolymers of these polyamides.

The plastic compositions can, of course, be modified by the incorporation of various plasticizers, e.g., camphor, aryl phosphates, alkyl phthalates, glycerol, castor oil, etc.; pigments, e.g., lithopone, graphite, carbon black, titanium oxide, phthalocyanine dyes, etc.; fillers, e.g., wood flour, diatomaceous earth, etc.

The spools should be photographically inert so that the film elements spooled thereon will not be deleteriously affected.

While the spool of this invention was expressly designed for use in motion picture cameras, it may find utility for other sheet materials, e.g., paper, cloth, unsensitized films, thread, rope, wire, etc.

An advantage of this invention is that the one-piece spool is simple in construction and economical to produce. Another advantage is that the spool is extremely light in weight and yet is sturdy and reliable in use. Still another advantage is that hand assembly of the spool has been eliminated and the spool is therefore of uniform construction. Still other advantages will be apparent from the foregoing description.

What is claimed is:
A one-piece spool for holding film comprising spaced, end flange members having an axial mounting aperture adapted to receive a coacting member and a hollow cylindrical hub extending therebetween and integrally connect- ed therewith, said hub having first, second and third slots extending through the walls of said hub and longitudinally the length of said hub terminating at said flange members thereby separating said hub into first, second and third sections, the centerlines of said second and third slots being parallel to and equally offset from a diameter of said hub and the centerline of said first slot being a diameter of said hub and parallel to said other two centerlines, said first slot at the opposite end of its diameter centerline being opposed by a first section of said hub of circumferential length equal to that of said first slot, said second and third slots being located on either side of said first hub section, both said second and third slots along the opposite ends of their centerlines being opposed respectively to said second and third sections of said hub which are located on either side of said first slot.

References Cited in the file of this patent

UNITED STATES PATENTS

| | | |
|---|---|---|
| 1,817,217 | Victor | Aug. 1, 1931 |
| 2,055,626 | Howell | Sept. 29, 1936 |
| 2,065,575 | Gavin | Dec. 29, 1936 |
| 2,169,399 | Steiner | Aug. 15, 1939 |
| 2,339,443 | Wilson | Jan. 18, 1944 |
| 2,652,918 | Lippert | Sept. 22, 1953 |
| 2,759,681 | Rissberger et al. | Aug. 21, 1956 |
| 2,890,487 | Morin | June 16, 1959 |

FOREIGN PATENTS

| | | |
|---|---|---|
| 985,947 | France | Mar. 21, 1951 |
| 1,191,627 | France | Apr. 13, 1959 |
| 711,451 | Great Britain | June 30, 1954 |